United States Patent [19]

Shah et al.

[11] Patent Number: 5,719,219
[45] Date of Patent: Feb. 17, 1998

[54] PROCESS FOR PRODUCING A NONWOVEN WEB USING SILANE MODIFIED ELASTOMERIC COMPOSITIONS

[75] Inventors: Ketan N. Shah, Appleton; Stephen M. Campbell, Omro, both of Wis.

[73] Assignee: Kimberly-Clark Worldwide, Inc., Neenah, Wis.

[21] Appl. No.: 653,089

[22] Filed: May 25, 1996

Related U.S. Application Data

[60] Continuation of Ser. No. 443,738, May 18, 1995, abandoned, which is a division of Ser. No. 333,805, Nov. 3, 1994, abandoned.

[51] Int. Cl.$^6$ .................................................. B32B 7/00
[52] U.S. Cl. .................... 524/264; 524/505; 264/211; 264/211.24; 442/62; 442/87; 442/81; 442/99; 428/447; 525/88; 525/288; 525/326.5
[58] Field of Search .................... 442/62, 87, 81, 442/99; 524/264, 505; 525/88, 288, 326.5; 428/447; 264/211, 211.24

[56] References Cited

U.S. PATENT DOCUMENTS

| | | | |
|---|---|---|---|
| 2,831,829 | 4/1958 | Brooks et al. | 260/41.5 |
| 3,338,992 | 8/1967 | Kinney | 264/24 |
| 3,341,394 | 9/1967 | Kinney | 161/72 |
| 3,502,763 | 3/1970 | Hartmann | 264/210 |
| 3,503,943 | 3/1970 | Kresge et al. | 260/80.78 |
| 3,542,615 | 11/1970 | Dobo et al. | 156/181 |
| 3,644,315 | 2/1972 | Gardner et al. | 260/85.3 |
| 3,646,155 | 2/1972 | Scott | 260/827 |
| 3,655,420 | 4/1972 | Tichenor | 117/138.8 A |
| 3,692,618 | 9/1972 | Dorschner et al. | 161/72 |
| 3,798,196 | 3/1974 | Rocktaschel et al. | 260/41.5 A |
| 3,802,817 | 4/1974 | Matsuki et al. | 425/66 |
| 3,830,872 | 8/1974 | Schrage et al. | 260/827 |
| 3,849,241 | 11/1974 | Butin et al. | 161/169 |
| 3,855,046 | 12/1974 | Hansen et al. | 161/150 |
| 3,909,009 | 9/1975 | Cvetko et al. | 274/37 |
| 3,929,850 | 12/1975 | Streck et al. | 528/32 |
| 3,938,574 | 2/1976 | Burmester et al. | 152/330 R |
| 3,947,436 | 3/1976 | Rocktaschel et al. | 260/249.5 |
| 3,962,500 | 6/1976 | Smith | 427/387 |
| 4,041,203 | 8/1977 | Brock et al. | 428/157 |
| 4,048,129 | 9/1977 | Voigt | 260/23 H |
| 4,058,583 | 11/1977 | Glander et al. | 264/176 R |
| 4,117,063 | 9/1978 | Voigt et al. | 264/102 |
| 4,289,860 | 9/1981 | Glander et al. | 525/263 |
| 4,340,563 | 7/1982 | Appel et al. | 264/518 |
| 4,341,213 | 7/1982 | Cohen | 524/425 |
| 4,374,888 | 2/1983 | Bornslaeger | 428/198 |
| 4,400,485 | 8/1983 | Makamal et al. | |
| 4,443,513 | 4/1984 | Meitner et al. | 422/195 |
| 4,603,158 | 7/1986 | Markham et al. | 524/100 |
| 4,618,654 | 10/1986 | Schmidtchen et al. | 525/288 |
| 4,663,220 | 5/1987 | Wisneski et al. | 428/221 |
| 4,714,739 | 12/1987 | Arkles | 525/92 |
| 4,787,991 | 11/1988 | Morozumi et al. | 252/12.4 |
| 4,798,864 | 1/1989 | Topcik | 525/71 |
| 4,857,251 | 8/1989 | Nohr et al. | 264/103 |
| 4,965,122 | 10/1990 | Morman | 428/225 |
| 4,970,263 | 11/1990 | Arkles et al. | 525/105 |
| 4,981,747 | 1/1991 | Morman | 428/198 |
| 4,985,023 | 1/1991 | Blank et al. | 523/122 |
| 5,032,445 | 7/1991 | Dana et al. | 428/394 |
| 5,036,127 | 7/1991 | Ueno et al. | |
| 5,070,127 | 12/1991 | Auerbach | |
| 5,077,135 | 12/1991 | Wyman | 428/447 |
| 5,082,738 | 1/1992 | Swofford | 428/437 |
| 5,108,820 | 4/1992 | Kaneko et al. | 428/198 |
| 5,108,827 | 4/1992 | Gessner | 428/219 |
| 5,114,781 | 5/1992 | Morman | 428/198 |
| 5,139,878 | 8/1992 | Kim et al. | 428/421 |
| 5,169,706 | 12/1992 | Collier, IV et al. | 428/152 |
| 5,282,848 | 2/1994 | Schmitt | 623/1 |
| 5,336,552 | 8/1994 | Strack et al. | 428/224 |
| 5,362,553 | 11/1994 | Dillon et al. | 442/87 |
| 5,380,583 | 1/1995 | Occhiello et al. | 428/283 |
| 5,403,891 | 4/1995 | Romenesko | 524/264 |
| 5,593,628 | 1/1997 | Scholz et al. | 264/154 |

FOREIGN PATENT DOCUMENTS 0 586 924A1  3/1994  European Pat. Off. .

OTHER PUBLICATIONS

*Polymer Blends and Composites* by John A. Manson and Leslie H. Sperling, Plenum Press, NY, Copyright 1976, IBN 0-306-30831-2 pp. 273-277.

*Silane Coupling Agents,* by Edwin P. Pleuddemann, Plenum Press, NY Second Edition, 1991, pp. 18-22.

Primary Examiner—Andrew E. C. Merriam
Attorney, Agent, or Firm—James B. Robinson; William D. Herrick

[57] ABSTRACT

There is provided a melt extrudable, moisture curable thermoplastic polymer which is produced from a silane modified elastomeric polymer and which has improved hysteresis, reduced stress decay and improved creep properties. The polymer may be processed into a nonwoven web, film or foam which may be laminated to other materials such as spunbond polyolefin layers and may be used in medical, personal care, feminine hygiene and other applications.

6 Claims, No Drawings

PROCESS FOR PRODUCING A NONWOVEN WEB USING SILANE MODIFIED ELASTOMERIC COMPOSITIONS

This application is a continuation of application Ser. No. 08/443,738, now abandoned, entitled "SILANE MODIFIED ELASTOMERIC COMPOSITIONS AND ARTICLES MADE THEREFROM" and filed in the U.S. Patent and Trademark Office on May 18, 1995. The entirety of this application is hereby incorporated by reference, which is a divisional of application Ser. No. 08/333,805, now abandoned, entitled "SILANE MODIFIED ELASTOMERIC COMPOSITIONS AND ARTICLES MADE THEREFROM" and which was filed in the U.S. Patent and Trademark Office on Nov. 3, 1994.

BACKGROUND OF THE INVENTION

This invention relates to the modification of polymers useful in producing nonwoven webs, films and foams. More particularly, it relates to the modification of elastomeric polymers in order to increase the internal bonding in such materials and thereby improve their properties.

Nonwoven fabrics or webs and films are useful in a variety of applications and are often included as components of diapers, feminine care products, and surgical gowns as well as more durable applications in geotextiles, car covers and other protective fabrics.

Nonwoven webs are produced by binding together a multitude of individual filaments or fibers made from various polymers such as polyolefins, polyesters, polyetheresters, polyamides and polyurethanes. These filaments may be made by a number of techniques, the most common being spunbonding and meltblowing.

More recent polymer developments have brought elastomeric polymers into prominence for the production of nonwoven webs, foams and films, since, though they are usually more costly than non-elastomeric polymers, they provide desirable stretch and recovery properties previously unavailable in such materials.

While elastomeric nonwoven webs represent a major step forward in many applications, an issue with nonwoven webs made from elastomeric polymers which has remained is the suitability of their stretch and recovery properties for particular end-use applications. A need has been perceived for an elastomeric nonwoven web with improved hysteresis, improved strength, reduced stress decay and improved creep properties and this likewise applies to films. Accordingly, it is an object of this invention to provide an elastomeric composition which will yield a film, foam or nonwoven web with improved hysteresis, improved strength, stress decay and creep properties.

SUMMARY

The objects of this invention are achieved by a melt extrudable, moisture curable polymer which is produced from a silane modified elastomeric polymer. The elastomeric polymer may be, for example, a polyolefin, polyester, polyetherester, polyamide or polyurethane and the silane may be an organosilane such as aminosilane, epoxysilane, ureidosilane, vinylsilane and mixtures thereof. The amount of silane added to the polymer is preferably between 0.01 and 10 weight percent and the web is exposed to conditions of humidity and temperature for a time sufficient to cure the polymer.

DEFINITIONS

As used herein the term "nonwoven fabric or web" means a web having a structure of individual fibers or threads which are interlaid, but not in an identifiable manner as in a knitted fabric. Nonwoven fabrics or webs have been formed from many processes such as for example, meltblowing processes, meltspraying processes, spunbonding processes, and bonded carded web processes. The basis weight of nonwoven fabrics is usually expressed in ounces of material per square yard (osy) or grams per square meter (gsm) and the fiber diameters useful are usually expressed in microns. (Note that to convert from osy to gsm, multiply osy by 33.91).

As used herein the term "microfibers" means small diameter fibers having an average diameter not greater than about 75 microns, for example, having an average diameter of from about 0.5 microns to about 50 microns, or more particularly, microfibers may have an average diameter of from about 2 microns to about 40 microns. Another frequently used expression of fiber diameter is denier. The diameter of, for example, a polypropylene fiber given in microns, may be converted to denier by squaring, and multiplying the result by 0.00629, thus, a 15 micron polypropylene fiber has a denier of about 1.42 ($15^2 \times 0.00629=1.415$).

As used herein the term "spunbonded fibers" refers to small diameter fibers which are formed by extruding molten thermoplastic material as filaments from a plurality of fine, usually circular capillaries of a spinnerette with the diameter of the extruded filaments then being rapidly reduced as, for example, in U.S. Pat. No. 4,340,563 to Appel et al., and U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. Nos. 3,502,763 and 3,909,009 to Levy, and U.S. Pat. No. 3,542,615 to Dobo et al. Spunbond fibers are generally continuous and have diameters larger than 7 microns, more particularly, between about 10 and 20 microns.

As used herein the term "meltblown fibers" means fibers formed by extruding a molten thermoplastic material through a plurality of fine, usually circular, die capillaries as molten threads or filaments into converging high velocity gas (e.g. air) streams which attenuate the filaments of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin. Meltblown fibers are microfibers which are generally smaller than 10 microns in diameter.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and random symmetries.

As used herein the term "bicomponent fibers" refers to fibers which have been formed from at least two polymers extruded from separate extruders but spun together to form one fiber. The polymers are arranged in substantially constantly positioned distinct zones across the cross-section of the bicomponent fibers and extend continuously along the length of the bicomponent fibers. The configuration of such a bicomponent fiber may be, for example, a sheath/core arrangement wherein one polymer is surrounded by another or may be a side by side arrangement or an "islands-in-the-sea" arrangement. Bicomponent fibers are taught in U.S. Pat. No. 5,108,820 to Kaneko et al., U.S. Pat. No. 5,336,552 to Strack et al., and European Patent 0586924. If two polymers are used they may be present in ratios of 75/25, 50/50, 25/75 or any other desired ratios.

As used herein the term "biconstituent fibers" refers to fibers which have been formed from at least two polymers extruded from the same extruder as a blend. The term "blend" is defined below. Biconstituent fibers do not have the various polymer components arranged in relatively constantly positioned distinct zones across the cross-sectional area of the fiber and the various polymers are usually not continuous along the entire length of the fiber, instead usually forming fibrils which start and end at random. Biconstituent fibers are sometimes also referred to as multiconstituent fibers. Fibers of this general type are discussed in, for example, U.S. Pat. No. 5,108,827 to Gessner. Bicomponent and biconstituent fibers are also discussed in the textbook *Polymer Blends and Composites* by John A. Manson and Leslie H. Sperling, copyright 1976 by Plenum Press, a division of Plenum Publishing Corporation of New York, IBSN 0-306-30831-2, at pages 273 through 277.

As used herein the term "blend" means a mixture of two or more polymers while the term "alloy" means a sub-class of blends wherein the components are immiscible but have been compatibilized. "Miscibility" and "immiscibility" are defined as blends having negative and positive values, respectively, for the free energy of mixing. Further, "compatibilization" is defined as the process of modifying the interfacial properties of an immiscible polymer blend in order to make an alloy.

As used herein, the term "bonding window" means the range of temperature of the calender rolls used to bond the nonwoven fabric together, over which such bonding is successful. For polypropylene spunbond, this bonding window is typically from about 270° F. to about 310° F. (132° C. to 154° C.). Below about 270° F. the polypropylene is not hot enough to melt and bond and above about 310° F. the polypropylene will melt excessively and can stick to the calender rolls. Polyethylene has an even narrower bonding window.

As used herein, the term "machine direction" or MD means the length of a fabric in the direction in which it is produced. The term "cross machine direction" or CD means the width of fabric, i.e. a direction generally perpendicular to the MD.

As used herein, the terms "necking" or "neck stretching" interchangeably refer to a method of elongating a nonwoven fabric, generally in the machine direction, to reduce its width in a controlled manner to a desired amount. The controlled stretching may take place under cool temperatures, room temperature or greater temperatures and is limited to an increase in overall dimension in the direction being stretched up to the elongation required to break the fabric, which in most cases is about 1.2 to 1.4 times. When relaxed, the web retracts toward its original dimensions. Such a process is disclosed, for example, in U.S. Pat. No. 4,443,513 to Meitner and Notheis, and U.S. Pat. Nos. 4,965,122, 4,981,747 and 5,114,781 to Morman.

As used herein the term "neck softening" means neck stretching carried out without the addition of heat to the material as it is stretched.

As used herein, the term "neckable material" means any material which can be necked.

As used herein, the term "necked material" refers to any material which has been constricted in at least one dimension by processes such as, for example, drawing or gathering.

As used herein the term "recover" refers to a contraction of a stretched material upon termination of a biasing force following stretching of the material by application of the biasing force. For example, if a material having a relaxed, unbiased length of one (1) inch was elongated 50 percent by stretching to a length of one and one half (1.5) inches the material would have a stretched length that is 150 percent of its relaxed length. If this exemplary stretched material contracted, that is recovered to a length of one and one tenth (1.1) inches after release of the biasing and stretching force, the material would have recovered 80 percent (0.4 inch) of its elongation.

As used herein the term "un-necking" means a process applied to a reversibly necked material to extend it to at least its original, pre-necked dimensions by the application of a stretching force in a longitudinal or cross-machine direction which causes it to recover to within at least about 50 percent of its reversibly necked dimensions upon release of the stretching force.

As used herein, the term "medical product" means surgical gowns and drapes, face masks, head coverings, shoe coverings wound dressings, bandages, sterilization wraps and the like.

As used herein, the term "personal care product" means diapers, training pants, absorbent underpants, adult incontinence products, wipers and feminine hygiene products.

As used herein, the term "outdoor fabric" means a fabric which is primarily, though not exclusively, used outdoors. Outdoor fabric includes fabric used in protective covers, camper/trailer fabric, tarpaulins, awnings, canopies, tents, agricultural fabrics and outdoor apparel such as head coverings, industrial work wear and coveralls, pants, shirts, jackets, gloves, socks, shoe coverings, and the like.

As used herein, the term "protective cover" means a cover for vehicles such as cars, trucks, boats, airplanes, motorcycles, bicycles, golf carts, etc., covers for equipment often left outdoors like grills, yard and garden equipment (mowers, roto-tillers, etc.) and lawn furniture, as well as floor coverings, table cloths and picnic area covers.

DETAILED DESCRIPTION OF THE INVENTION

Elastomeric polymers are useful in the production of nonwoven webs, films and foams for a variety of applications.

Nonwoven fabrics have been produced for a number of years according to, for example, the spunbonding and meltblowing processes. Such webs are useful in applications such as garments, personal care products, medical products and outdoor fabrics. The preferred process for the practice of this invention is meltblowing. Nonwoven webs are made from filaments or fibers of thermoplastic polymer extruded through small orifices and then usually drawn by air streams and deposited onto a moving conveyor belt or "forming wire". After deposition onto the forming wire the filaments may be bonded between the rollers of a heated calender for increased web integrity if necessary or may be further processed into another form directly.

Nonwoven webs are most commonly produced from homopolymers. Nonwoven fabrics of biconstituent fibers may also be used in these processes and the web may be formed from bicomponent fibers as well.

A relatively recent development in the production of nonwoven webs has been the use of elastomeric thermoplastic polymers to form the filaments for the web. Such polymers provide the added property of stretch and recovery to the web and open new avenues of application for such materials. While such materials have found widespread acceptance, there remains a need for an elastomeric polymer which can be processed into a film, foam or nonwoven web with superior recovery properties than those which are currently available. This invention provides such materials.

The instant invention provides a thermoplastic polymer suitable for nonwoven web, film and foam production, wherein the original elastomeric polymer has been modified by the addition of a silane. Such modification results in superior hysteresis, strength, creep resistance and stress decay when compared to a non-modified elastomeric polymer.

Elastomeric polymers useful in film and foam production and spunbonding and meltblowing generally include polyolefins like styrenic block copolymers, polyesters, polyetheresters, polyamides, polyurethanes, ethylene vinyl acetates (EVA) and the like.

Styrenic block copolymers include styrene/butadiene/styrene (SBS) block copolymers, styrene/isoprene/styrene (SIS) block copolymers, styrene/ethylene-propylene/styrene (SEPS) block copolymers, styrene/ethylene-butadiene/styrene (SEBS) block copolymers. For example, useful elastomeric fiber forming resins include block copolymers having the general formula A—B—A' or A—B, where A and A' are each a thermoplastic polymer endblock which contains a styrenic moiety such as a poly (vinylarene) and where B is an elastomeric polymer midblock such as a conjugated diene or a lower alkene polymer. Block copolymers of the A—B—A' type can have different or the same thermoplastic block polymers for the A and A' blocks, and the present block copolymers are intended to embrace linear, branched and radial block copolymers. In this regard, the radial block copolymers may be designated $(A—B)_m—X$, wherein X is a polyfunctional atom or molecule and in which each $(A—B)_m—$ radiates from X in a way that A is an endblock. In the radial block copolymer, X may be an organic or inorganic polyfunctional atom or molecule and m is an integer having the same value as the functional group originally present in X. X is usually at least 3, and is frequently 4 or 5, but not limited thereto. Thus, in the present invention, the expression "block copolymer", and particularly "A—B—A'" and "A—B" block copolymer, is intended to embrace all block copolymers having such rubbery blocks and thermoplastic blocks as discussed above, which can be extruded (e.g., by meltblowing), and without limitation as to the number of blocks.

U.S. Pat. No. 4,663,220 to Wisneski et al. discloses a web including microfibers comprising at least about 10 weight percent of an A—B—A' block copolymer where "A" and "A'" are each a thermoplastic endblock which comprises a styrenic moiety and where "B" is an elastomeric poly (ethylene-butylene) midblock, and from greater than 0 weight percent up to about 90 weight percent of a polyolefin which when blended with the A—B—A' block copolymer and subjected to an effective combination of elevated temperature and elevated pressure conditions, is adapted to be extruded in blended form with the A—B—A' block copolymer. Polyolefins useful in Wisneski et al. may be polyethylene, polypropylene, polybutene, ethylene copolymers, propylene copolymers, butene copolymers, and mixtures thereof.

Commercial examples of such elastomeric copolymers are, for example, those known as KRATON® materials which are available from Shell Chemical Company of Houston, Texas. KRATON® block copolymers are available in several different formulations, a number of which are identified in U.S. Pat. No. 4,663,220, hereby incorporated by reference. Particularly suitable elastomeric polymers are elastomeric poly(styrene/ethylene-butylene/styrene) block copolymers available from the Shell Chemical Company of Houston, Tex. under the trade designations KRATON® G-1657 and KRATON® G-2740.

Silanes are known in the art as being useful coupling agents in binding various materials to glass. For example, silane coupling agents have long been used in the glass fiber industry to form a bond between the glass fiber surface and the resin into which the glass fibers are added for reinforcement. In such bonding, it is generally believed that the silicon atom of the silane coupling agent forms a bond or attraction with the silicon atoms of the glass, while the hydrocarbon portion of the silane coupling agent forms a bond or attraction with the hydrocarbon resin. This covalent bonding theory is further explored in *Silane Coupling Agents* by Edwin P. Pluedemann, Plenum Press, New York, N.Y., second edition, 1991, p 18–22. It is somewhat surprising, therefore, that silane coupling agents would enhance or improve the intra- and/or inter-filamentary bonding within an entirely hydrocarbon matrix.

The silanes useful in this invention are those which contain hydrocarbon moieties, i.e. organosilanes, including organoalkoxysilanes and are of the following formula:

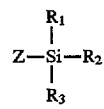

wherein Z represents a vinyl, allyl or other double bonded group capable of reaction under radical polymerization conditions, $R_1$, $R_2$, and $R_3$ are reactive such as methoxy, ethoxy and other alkoxy groups, amino, epoxy, ureido, and vinyl groups, Cl or Br halogens, esters such as acetoxy groups, or unreactive groups such as O—Si, alkyl or aryl hydrocarbon groups. The three R groups may all be the same or different but at least one R group must be reactive in order to function as a hydrolytically reactive agent.

The silanes useful in the practice of this invention include aminosilanes, epoxysilanes, ureidosilanes, vinylsilanes and the like. Nonexclusive examples include gamma-aminotrimethoxysilane, gamma-aminotriethoxysilane, aminomethyltriethoxysilane, triaminopropylethoxysilane, beta-hydroxyethyltriethoxysilane, 2,3-epoxypropyltrimethoxysilane, 3,4-epoxybutyltriethoxysilane, vinyltrimethoxysilane, vinyltriethoxysilane, glycidoxypropyltrimethoxysilane. A mixture of epoxy functional, amino functional and/or vinyl functional organosilanes is also an acceptable alternative. The silane can also be used as its full or partial hydrolysis products or as its polymerization product.

A number of suppliers exist for these silanes, including Huls America Inc., OSI Specialties Inc., and Dow Corning Corporation. A preferred silane for the practice of this invention is a vinylsilane, more particularly a vinyltrialkoxysilane available under the trade designation SILCAT R® from the Union Carbide Corporation. SILCAT R® silane includes other additives such as dibutyltin maleate and cumyl peroxide in small amounts. Dibutyltin maleate promotes the silane hydrolysis reaction and cumyl peroxide promotes the grafting of the silane onto the hydrocarbon. The chemistry of hydrolysis and grafting promotion of silanes is well known in the art.

The silane used in this invention should be present in an amount between 0.01 and 10 weight percent of the thermoplastic polymer into which it is being mixed. More particularly, an amount between about 0.1 and 2.5 weight percent has been found to be satisfactory and still more particularly, an amount of about 1 weight percent.

The silanes useful in this invention are usually liquid at room temperature and pressure though may also be a solid in the form of a powder or granule, thus making the mixing process relatively straightforward. In order to practice this invention, the desired amount of silane is added to the hydrocarbon and thoroughly mixed. This mixing may be done by any method known in the art. After mixing, the mix is fed into an extruder where temperature and pressure are applied to melt the hydrocarbon and propel it towards the orifices through which it will be fiberized as noted in the above cited patents concerning meltblowing and spunbonding. The silane/hydrocarbon is then extruded through the orifices and fiberized, gathered onto a forming wire to form a web, and subsequently cured to create the inter- and intra-filamentary bonds which are believed to be the key to this invention.

Though the inventors do not wish to be bound by this belief for the purpose of the patent, they believe that the silane coupling agent promotes or allows the formation of inter- and/or intra-filamentary bonds within the web. Such bonds are believed to strengthen the web and improve its strength, hysteresis, creep and stress decay.

In order to promote the strengthening of the web, the web must be "cured". Curing is the process of exposing the web to sufficient moisture at a temperature and for a time sufficient to cause the above mentioned inter- and intra-filamentary bonds to form. Curing may be done by exposing the finished web to heat and moisture in an oven specifically designed for that purpose, placing the web in boiling water, spraying the web with warm water, passing the web through a water bath, exposing the web to steam or simply allowing the web to sit for an extended period of time at ambient conditions of temperature and humidity.

The inventors believe that hydrolysis of the silane by methods known in the art, prior to mixing with the hydrocarbon, should also function in this invention. Hydrolysis of silanes is usually accomplished by the addition of sufficient amounts of water and acid to the silane and allowing the reaction to take place. After hydrolysis, the silane may be added to the hydrocarbon and thoroughly mixed.

The fabric of this invention may be used as a multilayer laminate. An example of a multilayer laminate is an embodiment wherein some of the layers are spunbond and some meltblown such as a spunbond/meltblown/spunbond (SMS) laminate as disclosed in U.S. Pat. No. 4,041,203 to Brock et al., U.S. Pat. No. 5,169,706 to Collier, et al, and U.S. Pat. No. 4,374,888 to Bornslaeger. Laminates may of course be made with any number of meltblown or spunbond layers in various orders. In these laminates, the fabric of this invention is preferably the meltblown layer. An SMS laminate may be made, for example, by sequentially depositing onto a moving forming belt first a spunbond fabric layer, then a meltblown fabric layer and then adding a preformed second spunbond layer and bonding the laminate in a manner described below. Alternatively, the fabric layers may all be made individually, collected in rolls, and combined in a separate bonding step. In either case the meltblown layer has a spunbond layer adjacent to it on either side. Such laminates usually have a basis weight of from about 0.1 to 12 osy (6 to 400 gsm), or more particularly from about 0.75 to about 3 osy.

Nonwoven fabrics are generally bonded in some manner as they are produced in order to give them sufficient structural integrity to withstand the rigors of further processing into a finished product. Bonding can be accomplished in a number of ways such as hydroentanglement, needling, ultrasonic bonding, adhesive bonding and thermal bonding.

Ultrasonic bonding is performed, for example, by passing the fabric between a sonic horn and anvil roll as illustrated in U.S. Pat. No. 4,374,888 to Bornslaeger.

Thermal bonding of a nonwoven fabric may be accomplished by passing the nonwoven fabric between the rolls of a calendering machine. At least one of the rollers of the calender is heated and at least one of the rollers, not necessarily the same one as the heated one, has a pattern which is imprinted upon the nonwoven fabric as it passes between the rollers. As the fabric passes between the rollers it is subjected to pressure as well as heat. The combination of heat and pressure applied in a particular pattern results in the creation of fused bond areas in the nonwoven fabric where the bonds on the fabric correspond to the pattern of bond points on the calender roll.

Various patterns for calender rolls have been developed. One example is the Hansen-Pennings pattern with between about 10 to 25% bond area with about 100 to 500 bonds/square inch as taught in U.S. Pat. No. 3,855,046 to Hansen and Pennings. Another common pattern is a diamond pattern with repeating and slightly offset diamonds.

The exact calender temperature and pressure for bonding the nonwoven web depend on thermoplastic(s) from which the web is made. Generally for polyolefins the preferred temperatures are between 150° and 350° F. (66° and 177° C.) and the pressure between 300 and 1000 pounds per lineal inch. More particularly, for polypropylene, the preferred temperatures are between 270° and 320° F. (132° and 160° C.) and the pressure between 400 and 800 pounds per lineal inch.

The making of films is well known in the art and may be performed at pressures between about 50 and about 500 psi and at temperatures known in the art to be necessary for the production of a good quality film. Film production may generally be carried out according to U.S. Pat. No. 5,139,878 to Kim et al. Testing of the effect of silane addition to an elastomeric material was performed on films.

The following examples illustrate the superior stretch and recovery properties of silane treated elastomerics. Samples were prepared by casting the polymer into a film in a compression molding press at 350° F. (177° C.) and 100 psi over a period of 10 hours. Some of the films were then exposed to 80 percent relative humidity at 100° F. (38° C.) for 4 days for curing.

Mechanical and rheological properties of the sample films were measured and compared with those of virgin films under identical conditions. The stress was measured using a strip of film 2 inches (51 mm) long, 0.012 inches thick (0.3 mm) and 0.25 inches (8.4 mm) wide which was stretched at a rate of 300 mm/min to 50 and 300 percent of the unstretched length and is measured in grams. The stress-relaxation response was measured by stretching a strip of film, 2 inches (51 mm) long, 0.012 inches thick (0.3 mm) and 0.375 inches (9.5 mm) wide at a rate of 300 mm/min up to 50 percent extension and then holding it at that extension for 20 minutes. The stress-relaxation was calculated as: (stress at 50% extension—stress at 50% extension after 20 min.) divided by (stress at 50% extension) and is expressed in percent.

In the examples in which silane is used, pellets of elastomeric material were coated with the silane and allowed to stand for at least 8 hours so that the silane could be absorbed into the pellets prior to being cast into a film. Table 1 shows the results using Kraton® 1657 polymer pellets and Table 2 shows the results using Kraton® G2740X polymer pellets.

TABLE 1

| Example | Silane, Wt % | Humidity Days | Stress at 50% | Stress at 300% | Stress relaxation |
|---|---|---|---|---|---|
| 1 | 0 | 0 | 127 | 200 | 23 |
| 2 | 0 | 4 | 101 | 186 | 22 |
| 3 | 1 | 4 | 162 | 370 | 23 |

TABLE 2

| Example | Silane, Wt % | Humidity Days | Stress at 50% | Stress at 300% | Stress relaxation |
|---|---|---|---|---|---|
| 4 | 0 | 0 | 131 | 215 | 33 |
| 5 | 0 | 4 | 117 | 215 | 33 |
| 6 | 1 | 4 | 150 | 290 | 32 |

These results show a large increase in strength without any deterioration in stress-relaxation after the addition of the silane. The results for Kraton® 1657 polymer show an approximate 85 percent increase in strength at 300 percent extension and an approximately 28 percent increase in strength at 50 percent extension with virtually no change in stress relaxation. The results for Kraton® G2740X polymer show an approximate 35 percent increase in strength at 300 percent extension and an approximately 15 percent increase in strength at 50 percent extension with virtually no change in stress relaxation.

I claim:

1. A process of producing a nonwoven web comprising:

adding a silane in an amount between about 0.01 and about 10 weight percent to a melt extrudable, thermoplastic polymer, thoroughly mixing with and grafting onto said polymer said silane having the formula:

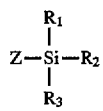

wherein,

Z is selected from the group consisting of double bonded groups capable of reaction under radical polymerization conditions;

$R_1$, $R_2$, and $R_3$ are selected from the group consisting of alkoxy, Cl, Br, ester, O—Si, alkyl and aryl groups, provided, however, that at least one R group must be reactive in order to function as a hydrolytically reactive agent; and extruding and fiberizing said polymer through orifices, forming said web and exposing said web to moisture for a time and temperature sufficient to cure said polymer.

2. The process of claim 1 wherein said silane is a vinyltrialkoxysilane.

3. The polymer of claim 2 wherein said web has a recovery strength of at least 15 percent greater at 50 percent extension, than a similar elastomeric nonwoven web produced without silane modified polymer.

4. The process of claim 2 further comprising the step of bonding a first layer of a spunbond polypropylene fabric to said web by a method selected from the group consisting of thermal bonding, ultrasonic bonding, hydroentanglement, needlepunch bonding and adhesive bonding.

5. The process of claim 4 further comprising the step of bonding a second layer of a spunbond polypropylene adjacent said thermoplastic polymer web by a method selected from the group consisting of thermal bonding, ultrasonic bonding, hydroentanglement, needlepunch bonding and adhesive bonding.

6. A process of producing an elastomeric nonwoven web comprising thoroughly mixing with and grafting onto a poly(styrene/ethylene-butylene/styrene) block copolymer a vinyltrimethoxysilane coupling agent in an amount between about 0.01 and about 10 weight percent, extruding and fiberizing said copolymer through orifices, forming said web and exposing said web to moisture for a time and temperature sufficient to cure said copolymer.

* * * * *

UNITED STATES PATENT AND TRADEMARK OFFICE
CERTIFICATE OF CORRECTION

PATENT NO. : 5,719,219
DATED : February 17, 1998
INVENTOR(S) : Ketan N. Shah et al.

It is certified that error appears in the above-identified patent and that said Letters Patent is hereby corrected as shown below:

Column 10, Line 23, "polymer" should read -- process --

Signed and Sealed this

Second Day of February, 1999

Attest:

Attesting Officer

Acting Commissioner of Patents and Trademark